(12) United States Patent
Vanderhye et al.

(10) Patent No.: US 7,980,825 B2
(45) Date of Patent: Jul. 19, 2011

(54) SAVONIUS ROTOR BLADE CONSTRUCTION PARTICULARLY FOR A THREE BLADED SAVONIUS ROTOR

(75) Inventors: Robert A. Vanderhye, McLean, VA (US); Gregory J T Lowe-Wylde, Oshawa (CA)

(73) Assignee: Robert A. Vanderhye, McLean, VA (US)

(*) Notice: Subject to any disclaimer, the term of this patent is extended or adjusted under 35 U.S.C. 154(b) by 1334 days.

(21) Appl. No.: 11/251,773

(22) Filed: Oct. 18, 2005

(65) Prior Publication Data

US 2007/0086895 A1    Apr. 19, 2007

(51) Int. Cl.
   *F03D 3/06*    (2006.01)
(52) U.S. Cl. ............ 416/197 R; 416/243; 416/170 R; 415/4.2; 415/122.1; 415/907
(58) Field of Classification Search .......... 415/4.2, 415/4.4, 907, 122.1; 416/197 R, 243, DIG. 9, 416/170 R
See application file for complete search history.

(56) References Cited

U.S. PATENT DOCUMENTS

| | | |
|---|---|---|
| 1,697,574 A | 1/1929 | Savonius |
| 1,768,765 A | 6/1930 | Savonius |
| 1,935,097 A | 11/1933 | Nelson |
| 2,677,344 A | 5/1954 | Annis |
| 4,156,580 A | 5/1979 | Pohl |
| 4,191,507 A | 3/1980 | DeBerg |
| 4,245,958 A | 1/1981 | Ewers |
| 4,274,011 A | 6/1981 | Garfinkle |
| 4,359,311 A | 11/1982 | Benesh |
| 4,715,776 A | 12/1987 | Benesh |
| 4,830,570 A | 5/1989 | Benesh |
| 5,083,039 A | 1/1992 | Richardson et al. |
| 5,984,814 A | 11/1999 | Davenport |
| 6,270,308 B1 * | 8/2001 | Groppel ............... 415/4.3 |
| 6,293,835 B2 | 9/2001 | Garlov |
| 6,428,275 B1 | 8/2002 | Jaakkola |
| 6,608,397 B2 | 8/2003 | Makino et al. |
| 6,616,402 B2 * | 9/2003 | Selsam ................ 415/3.1 |

(Continued)

FOREIGN PATENT DOCUMENTS

DE    4016622    11/1991

(Continued)

OTHER PUBLICATIONS

Blackwell et al, "Wind Tunnel Performance Data for Two and Three Bucket Savonius Rotors", Sandia Labs, SAND76-0131, Jul. 1977, pp. 1,3,10-21 & 29-34.

(Continued)

*Primary Examiner* — Igor Kershteyn

(57) ABSTRACT

A Savonius vertical axis wind turbine rotor, that is effective yet relatively easy to manufacture, includes spokes, vanes, and fasteners. Each spoke has a hub having a central opening, three arcuate ribs extending radially outwardly from the hub with inner (concave) and outer (convex) surfaces, and channels defined in at least one of the inner and outer surfaces. The vanes of sheet material generally conform to an inner or outer surface of a rib and have openings aligned with the channels. First fasteners pass through the openings and cooperate with second fasteners in the channels. Two of the spoke pieces may be joined by a bridging piece, and two spoke pieces by a clamp. A Savonius or helical rotor includes a generator, and a drive connecting the generator and rotor. The drive automatically increases the effective gear ratio between the generator and rotor as the speed of rotation increases.

19 Claims, 7 Drawing Sheets

U.S. PATENT DOCUMENTS

| | | | |
|---|---|---|---|
| 6,779,415 B2 * | 8/2004 | Gogins | 74/124 |
| 6,808,366 B2 * | 10/2004 | Sikes | 416/1 |
| 7,008,171 B1 * | 3/2006 | Whitworth | 415/4.2 |
| D523,948 S * | 6/2006 | Young | D23/411 |
| 7,115,066 B1 * | 10/2006 | Lee | 477/15 |
| 2002/0131864 A1 | 9/2002 | Vos et al. | |

FOREIGN PATENT DOCUMENTS

| | | |
|---|---|---|
| GB | 244414 | 9/1926 |
| JP | 55069768 | 5/1980 |
| JP | 58187587 | 11/1983 |
| RU | 2101553 | 10/1998 |
| WO | WO2004.113721 A1 | 6/2004 |

OTHER PUBLICATIONS

Khan, "Model and Prototype Performance Characteristics of Savonius Rotor Windmill", Wind Engineering, vol. 2, No. 2, 1978, pp. 75-85.

Boll, "More on the Savonius SuperRotor", Mother Earth News, No. 28, Jul./Aug. 1974.

Saha et al, "Twisted Bamboo Bladed Rotor For Savonius Wind Turbines", 2004.

Rahman, "Torque and Draf Characteristics of a Three Bladed Savonius Rotor", sss.buet.ac.bd/daers/mscthesis/mscme.htm, Sep. 1999, Abstract.

Idan et al, "Continuous Variable Speed Wind Turbine Transmission Concept and Robust Control", Wind Engineering, vol. 24, No. 3, 2000, pp. 151-167.

Johnson, Gary L., Wind Energy Systems, "Methods of Generating Synchronous Power", Nov. 21, 2001, pp. 5-1 thru 5-4.

Gigliobianco et al, "A Self-Trimming . . . Catamaran", AYRS 112, 1993, pp. 29-32.

Rensselaer School of Engineering, "Winding UpWard with Corks and Turbines", www.eng.rpi.edu, Sep. 20, 2003.

Turner, Lance, "Making a simple Savonius wind turbine", www.aya.org.au/70byosav.htm, admitted prior art.

Popular Science, Jul. 1933, "New Rotor Ship Sails in Lightest Winds".

Hayashi et al, "Wind Tunnel Tests on a Three-stage Out-phase Savonius Rotor", 2004.

Environmental Building News, vol. 13, No. 4, Apr. 2004, "Solar-and Wind-Powered Outdoor Lighting from MoonCell".

LandRider Owner's Manual, Version 7, 2002, pp. 13-20.

"Our Wind Turbine", www.windausenergy.com, 2004.

WS-models, 2002, www.windside.com.

* cited by examiner

SAVONIUS ROTOR BLADE CONSTRUCTION PARTICULARLY FOR A THREE BLADED SAVONIUS ROTOR

CROSS REFERENCE TO RELATED APPLICATION

This application relates generally to the technology in co-pending application Ser. No. 11/113,176 filed Apr. 25, 2005, and specifically claims some of the features disclosed but not claimed therein. The disclosure of Ser. No. 11/113,176 is hereby incorporated by reference herein.

BACKGROUND AND SUMMARY OF THE INVENTION

The invention relates to a particular construction of Savonius rotor blade, a particular Savonius vertical axis wind turbine rotor, and a drive for a driven element operatively connected to a Savonius rotor which automatically increases the effective gear ratio between the driving and driven elements in response to rotational speed of the driving element. The Savonius rotor blade, and rotor, according to the present invention have numerous advantages over prior art Savonius blades and rotors. In particular, because of the unique construction of the blades according to the present invention, a three bladed Savonius rotor is provided which can be expected to operate much more smoothly and effectively than conventional two bladed Savonius rotors, and be constructed in an overall better manner.

In the following specification and claims the following terms have the indicated meanings:

"Cp" or "maximum power coefficient" means (as it normally does): Turbine torque times turbine rotational speed divided by freestream dynamic pressure times freestream velocity times the turbine swept area; or proportional to maximum power divided by swept area [that is $Cp=P/[1/2\ A\ \rho\ v^3]$ where P=power, A=swept area, $\rho$=the density of air (about 1.2 kg/m$^3$ at sea level and 70 degrees F.), and v=wind velocity].

"Tip Speed Ratio" or "TSR" means (as it normally does): blade tip speed divided by wind speed. A drag rotor cannot have a TSR greater than one.

"Curvature" of a blade means: The ratio of the radius of the blade to the depth. The smaller the ratio, the more pronounced the curvature.

"Skew factor" of a blade means: The maximum curvature depth location along the radius of a blade. The larger the skew factor, the closer the maximum curvature depth is to the free end of the blade.

"Aspect ratio" means (as it normally does): The ratio of the length (height) of a rotor (or individual blade of a rotor) to its diameter.

"Effective gear ratio" means: The rpm ratio between a driving and a driven component, whether gears or some other mechanical structure (such as chains and sprockets, pulleys and belts, cones and belts, etc.) are used to provide the operative connection between the driving and driven components.

"Operatively" means (as it normally does): Any connection or engagement that allows the components connected or engaged to function as designed.

Although from the time of filing his first patent application in 1924 (see canceled FIG. 6 of GB published specification 244,414) Sigurd Savonius—the inventor of the Savonius rotor—contemplated a three bladed version as well as two bladed versions, more than eighty years later there are few [e.g. see *Environmental Building News*, Vol. 13, #4, April, 2004, p. 7, "Solar and Wind-Powered Outdoor Lighting from MoonCell"] commercial versions of the three bladed version. Perhaps because extensive wind tunnel testing by Sandia Laboratories in 1977 [Blackwell et al, "*Wind Tunnel Performance Data For Two And Three-Bucket Savonius Rotors*", SAND76-0131, July, 1977] concluded "The maximum power coefficient of the two-bucket configuration is approximately 1.5 times that for the three-bucket configuration" [Id. At p. 31], there has been almost no attempt to optimize a three bladed Savonius rotor. Conversely, there has been a great deal of work done on optimizing two bladed configurations [for example see Khan, "*Model And Prototype Performance Characteristics Of Savonius Rotor Windmill*", Wind Engineering, Vol. 2, No. 2, 1978, pp. 75-85].

If a three bladed configuration of a Savonius rotor is optimized, the three bladed version can have advantages over and at least be competitive with two bladed versions. In addition to operating more smoothly, it can be just as easy or easier to manufacture; can have a Cp as great as, or greater than, two bladed versions with the same aspect ratio; and self-starts more easily. An important factor in the optimization of a three bladed Savonius rotor is the skew factor, something not even recognized as a result-effective variable for three bladed Savonius rotors in the prior art. It has been found that a high skew factor (e.g. at least about 0.6, preferably over about 0.7, and most preferably about 0.75-0.85), along with significant curvature, results in a rotor with a Cp about 2-5 times greater than those with similar curvatures but lower skew factors, e.g. 0.25 or 0.5 (about 0.5 being the common skew factor for three bladed Savonius rotors).

According to one aspect of the present invention there is provided a Savonius vertical axis wind turbine ("VAWT") rotor comprising: A plurality of spokes, each spoke comprising a hub having a substantially central opening, three at least partially arcuate ribs extending substantially radially outwardly from the hub with inner and outer surfaces, and a plurality of channels defined in at least one of the inner and outer surface of each rib. A plurality of vanes of sheet material generally conforming to an inner or outer surface of a rib and having openings therein operatively aligned with the channels. And first fasteners passing through the openings into the channels and cooperating with second fasteners provided within the channels to securely hold the vanes to the ribs, so that the vanes assume an at least partially curved configuration presenting alternately a substantially concave and substantially convex curvature to wind as the rotor rotates about a substantially vertical axis.

The openings in the ribs are preferably non-tapped, and preferably the first fasteners comprise bolts and the second fasteners comprise nuts. Preferably, each spoke is in three pieces each piece comprising a hub segment and an arcuate generally radial rib. Two of the spoke pieces may be joined by a bridging piece, and two of the pieces may be joined by a clamping mechanism which draws the pieces toward each other to reduce the size of the central opening. Desirably a central shaft extends between the hub central openings, the clamping mechanism clamping the spoke hub to the central shaft. In one embodiment the clamping mechanism comprises a first fastener receiving element operatively connected to one of the spoke pieces at the hub segment, and a second fastener receiving element operatively connected to another, adjacent, spoke piece at the hub segment; and a fastener extending between the fastener receiving elements for drawing the elements toward each other to effect clamping.

More generally, each hub defines a clamp adapted to cooperate with a shaft so that the hub is securely affixed to the shaft. The clamp may be as described above, that is comprises surfaces of the hub defining a substantially radial slot in the hub communicating with the central opening; first and second fastener receiving elements on opposite sides of the slot and operatively connected to the hub; and a fastener extending between the fastener receiving elements to draw the surfaces of the hub together.

Preferably, the vanes generally conform to the outer surfaces of the ribs and are operatively connected thereto. Also, preferably each of the ribs has a free end opposite the hub, and a supporting element [e.g. strut or bar] extending between a central portion of the rib and a portion adjacent the free end thereof which increases the strength of the rib. Where three spoke pieces are provided, the rib of each spoke piece has a free end opposite the hub segment, and a supporting element extending between a central portion of the rib and a portion adjacent the free end thereof which increases the strength of the rib, and typically the spoke pieces are substantially identical.

The invention also relates to a substantially rigid spoke piece for a Savonius wind turbine comprising: a hub segment having an arcuate extend of roughly about 120 degrees and defining with two other spoke pieces a substantially circular opening; and a generally radial rib having a substantially convex surface and a substantially concave surface. The rib of the spoke piece has a free end opposite the hub segment, and preferably a supporting element extending between a central portion of the rib and a portion adjacent the free end thereof which increases the strength of the rib.

According to another aspect of the invention, a VAWT is provided comprising: A Savonius rotor comprising a plurality (preferably two or three) of blades having generally convex and concave surfaces operatively connected to each other, or a helical rotor. A driven element (such as an electrical generator or alternator, as disclosed in U.S. Pat. No. 6,172,429; a propeller, such as disclosed in co-pending application Ser. No. 10/443,954 filed May 23, 2003, a pump, etc.). And, a drive operatively connecting the driven element to the rotor; the drive automatically increasing the effective gear ratio as the speed of rotation of the rotor increases. [The maximum effective gear ratio is preferably at least about 10:1 when the driven element is a generator or alternator.] The Savonius rotor preferably further comprises at least one substantially vertical shaft operatively connected to the blades. Desirably, the drive directly senses rotor speed, or speed of an element operatively connected to the rotor, and does not and need not directly sense wind speed.

In one embodiment the drive comprises: A first sprocket operatively connected to the at least one shaft. Different size at least second and third sprockets, smaller than the first sprocket, and operatively connected to the driven element. A chain operatively connecting the first sprocket and one of the second or third sprockets. And a transmission comprising a centrifugal force responsive derailleur which automatically shifts the chain between the second and third sprockets. Especially where the driven element is a generator or alternator, the first sprocket and the third sprocket provide an effective gear ratio of at least 10:1, and the first sprocket and the second an effective gear ratio of less than 10:1.

While plural shaft versions of the Savonius rotor according to the invention—such as shown in co-pending application Ser. No. 10/854,280 filed May 27, 2004 (the disclosure of which is hereby incorporated by reference herein)—and other versions with spillover are within the scope of the invention, multiple shafts and significant spillover are not usually necessary when practicing the invention. That is, the Savonius rotor according to the invention may comprise a single shaft, with each spoke comprising a hub surrounding the shaft and operatively connected thereto to substantially preclude movement with respect to the shaft, the ribs extending generally radially outwardly from the hub.

It is a primary object of the present invention to provide an easily constructed and effective Savonius rotor having a wide variety of uses and used in a wide variety of manners while operating smoothly for effectively driving a number of different driven elements including a generator or alternator. This and other objects of the invention will become clear from a detailed description of the invention, and from the appended claims.

DETAILED DESCRIPTION OF THE DRAWINGS

Figure 1:
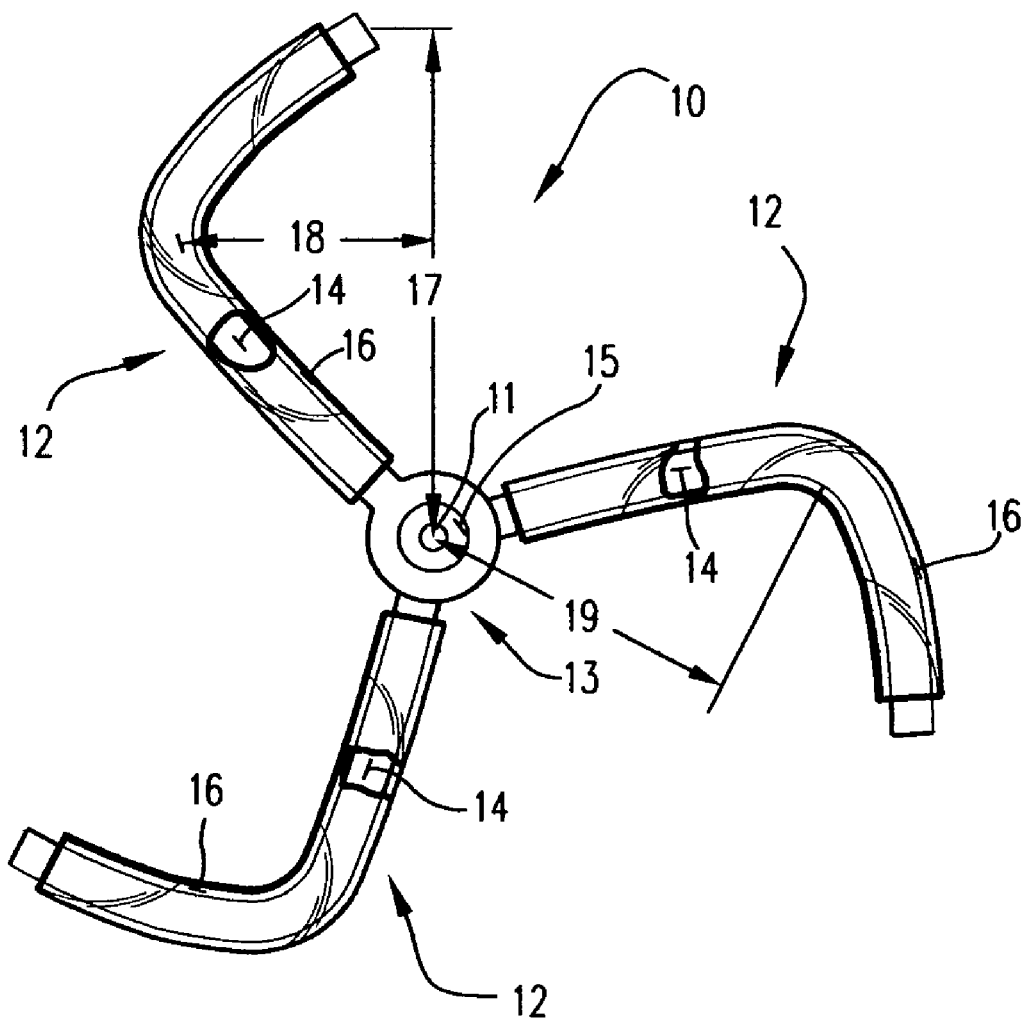
FIG. 1 is top plan view of a first Savonius construction.
Figure 5:
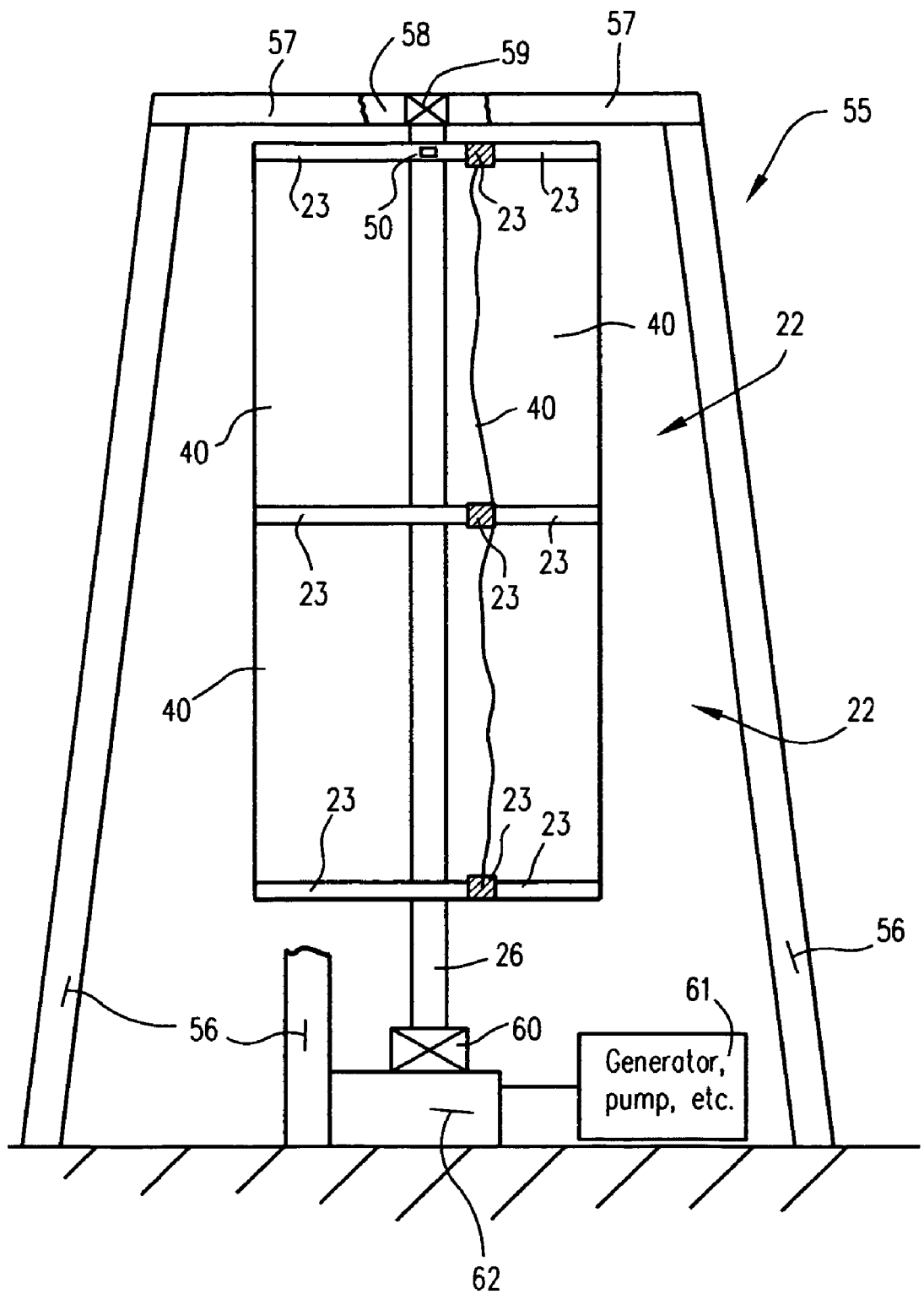
FIG. 5 is a side elevational view, with one set of ribs and associated vane cut away for clarity of illustration, of a Savonius rotor according to the present invention constructed according to FIGS. 3A & 4 in combination with a driven element according to the present invention.

FIG. 1 schematically illustrates, generally by reference numeral 10, an exemplary Savonius rotor for a VAWT. While the rotor 10 may be constructed using top and bottom discs as is common for Savonius rotors, preferably the rotor 10 includes a shaft 11, and three blades 12. While a single shaft 11 is preferred, a double shaft, or multiple shaft, embodiments may also be provided, as in U.S. patent application Ser. No. 10/854,280 filed May 27, 2004. Since it is the configuration of the blades 12 that is a major feature desirably illustrated therein, FIG. 1 shows a top plan view. However, it is understood that the rotor 10 will have the same basic construction as illustrated in FIG. 5.

In the embodiment of FIG. 1, the blades 12 are formed by a plurality of spokes 13 that are axially spaced along the shaft 11, only one spoke 13 visible in FIG. 1 since it is a top plan view. Each spoke 13 comprises three generally radially extending ribs 14 having a desired curvature and skew factor according to the present invention. In the FIG. 1 embodiment, the ribs extend outwardly from a central hub 15, which surrounds the shaft 11 and is operatively connected thereto (such as ultrasonically welded thereto, secured by mechanical fasteners, connected in the manners disclosed in co-pending application Ser. No. 11/113,176, or otherwise operatively connected thereto) The blades 12 further comprise vanes 16 which are shown as transparent material in FIG. 1, and extend substantially vertically between axially spaced, substantially vertically aligned, ribs 14.

The vanes 16 may be of any sheet material suitable for use in a Savonius wind turbine, including modern engineered sail cloth such as Pentex (modified, low stretch, polyester). In FIG. 1, for clarity of illustration, the vanes 16 are shown made of transparent flexible material, such as Pentex, wrapped around the ribs 14 and the free ends thereof stitched or otherwise affixed to the main body of the vanes 16 to hold them taut and in operative position. However it is preferred that the vanes 16 are of relatively rigid sheet material (though the sheets themselves are flexible). That is, the vanes 16 may be aluminum, titanium, carbon fiber or other composite material, polycarbonate (transparent or opaque, transparent being particularly appropriate when the rotor 12 drives a boat propeller), or other suitable material having characteristics (particularly strength, weight, and manufacturability) comparable (including superior) to polycarbonate or aluminum For example the vanes 16 may be of the materials specified in co-pending application Ser. No. 11/113,176.

The radius of each blade 12/rib 14 is the distance 17 from the center of the shaft 11 to the outer tip of rib 14. The depth of each blade 12/rib 14 is the maximum depth 18 thereof. The curvature of the blade 12 is the ratio of the radius 17 to the depth 18. In the FIG. 1 embodiment, the curvature is about 2.5:1. The skew factor is the location 19 at which the maximum depth 18 is located along the radius 17. In the FIG. 1 embodiment the skew factor 19 is about ¾, or about 0.75, that is the maximum depth 18 is located at about ¾ of the distance (the radius 17) from the center of shaft 11 to the tip of rib 14.

Figure 2:
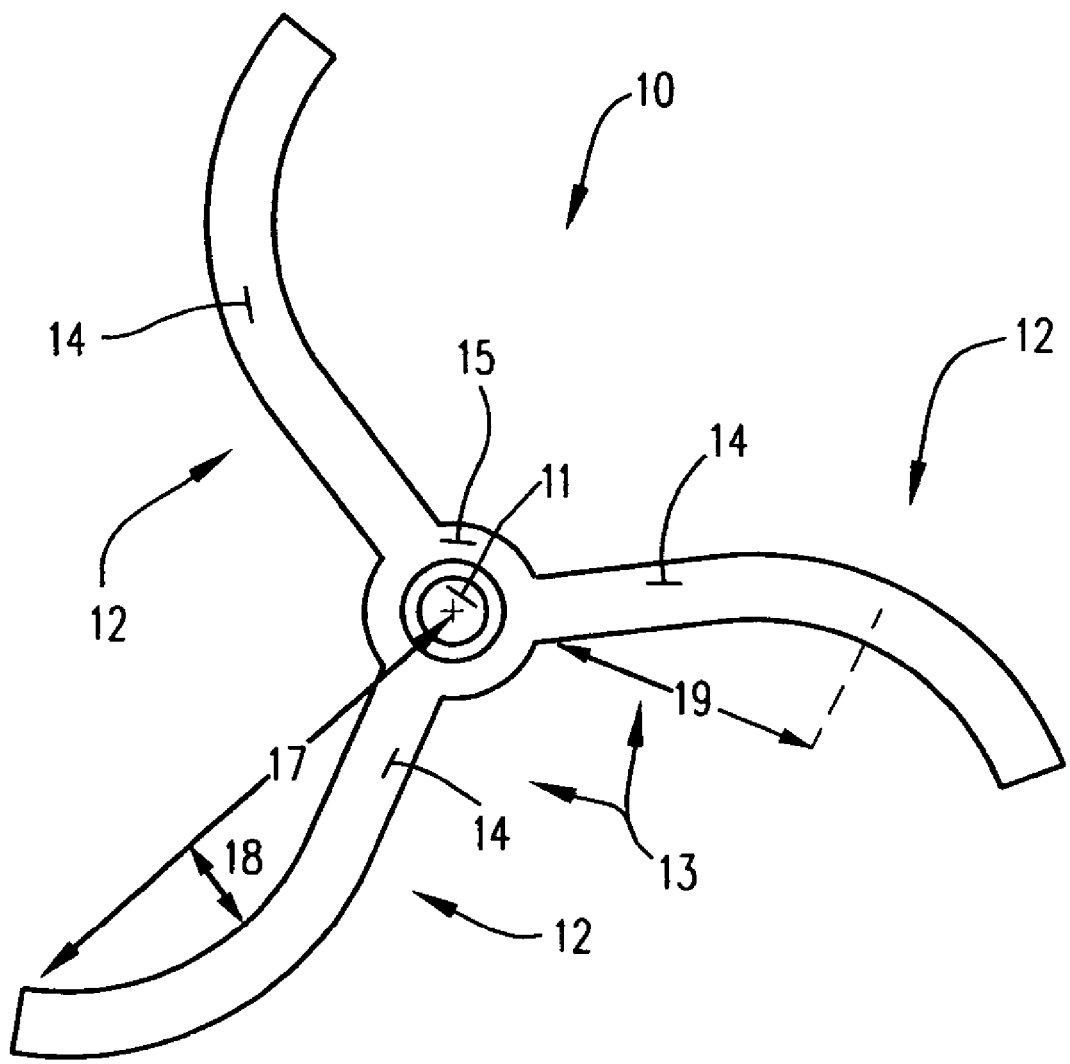
FIG. 2 is top plan view of a spoke of a second Savonius rotor.

FIG. 2 is another exemplary embodiment of a Savonius rotor component. In this embodiment, for clarity of illustration, the vane material 16 is not shown, only the spoke and shaft. The reference numerals in FIG. 2 correspond to comparable structures in FIG. 1. As in the FIG. 1 embodiment, in the FIG. 2 embodiment the centers of the blades 12 are arcuately spaced substantially uniformly from each other around the shaft 11, e.g. about 120 degrees.

In the FIG. 2 embodiment, the curvature is about 5:1, and the skew factor 19 is about 0.75. The radius 17 is less than in the FIG. 1 embodiment, meaning that for a particular length (height) of rotor 10 the aspect ratio of the FIG. 2 embodiment will be greater than for the FIG. 1 embodiment.

In actual testing of rotors constructed substantially according to the FIGS. 1 and 2 embodiments, using a plurality of spokes 13 spaced along the axis defined by shaft 11, with an aspect ratio of the FIG. 1 embodiment of about 0.85:1 and an aspect ratio of the FIG. 2 embodiment of about 1.2:1, both the rotors 12 of FIGS. 1 & 2 had a Cp of about 0.04. This compared to a Cp of about 0.008 for a rotor having a curvature of about 2.5:1 but a skew factor of about 0.25 and an aspect ratio of about 0.67; a Cp of about 0.022 for a rotor having a curvature of about 2.5:1 but a skew factor of about 0.5 and an aspect ratio of about 1.2:1; and a Cp of about 0.019 for a rotor with a curvature of about 5:1 but with a skew factor of about 0.25 and an aspect ratio of about 0.85:1. The Cp of the FIG. 1 embodiment would very likely have been greater than that of the FIG. 2 embodiment if the aspect ratios had been the same. This is because it is known in the art that for a Savonius rotor generally Cp increases as aspect ratio increases, at least up to an aspect ratio of about 3:1 (see *Mother Earth News*, Issue No. 28, July/August 1974 "More on The Savonius Super Rotor" by John Boll). Thus it can be concluded that a high skew factor with high curvature is particularly desirable for the blades 12 of a three bladed Savonius.

The blades 12 desirably have a curvature of greater than about 7:1 (preferably about 2:1 to 5.5:1) and a skew factor of greater than about 0.6 (preferably about 0.7 or greater, e.g. of about 0.75-0.85). Also, it is preferred that the aspect ratio of the rotor 10 be at least about 0.8:1, preferably at least about 2:1, e.g. about 3:1.

As with essentially all wind turbine rotors, the Cp of the rotors of the invention are at their maximum within a certain range of TSR. For example, the rotors of both FIGS. 1 & 2 will have their maximum Cps when the TSR is between about 0.2 and 0.45, gradually ramping up from a TSR of 0, and gradually ramping down form a TSR of about 0.45.

Figure 3A:
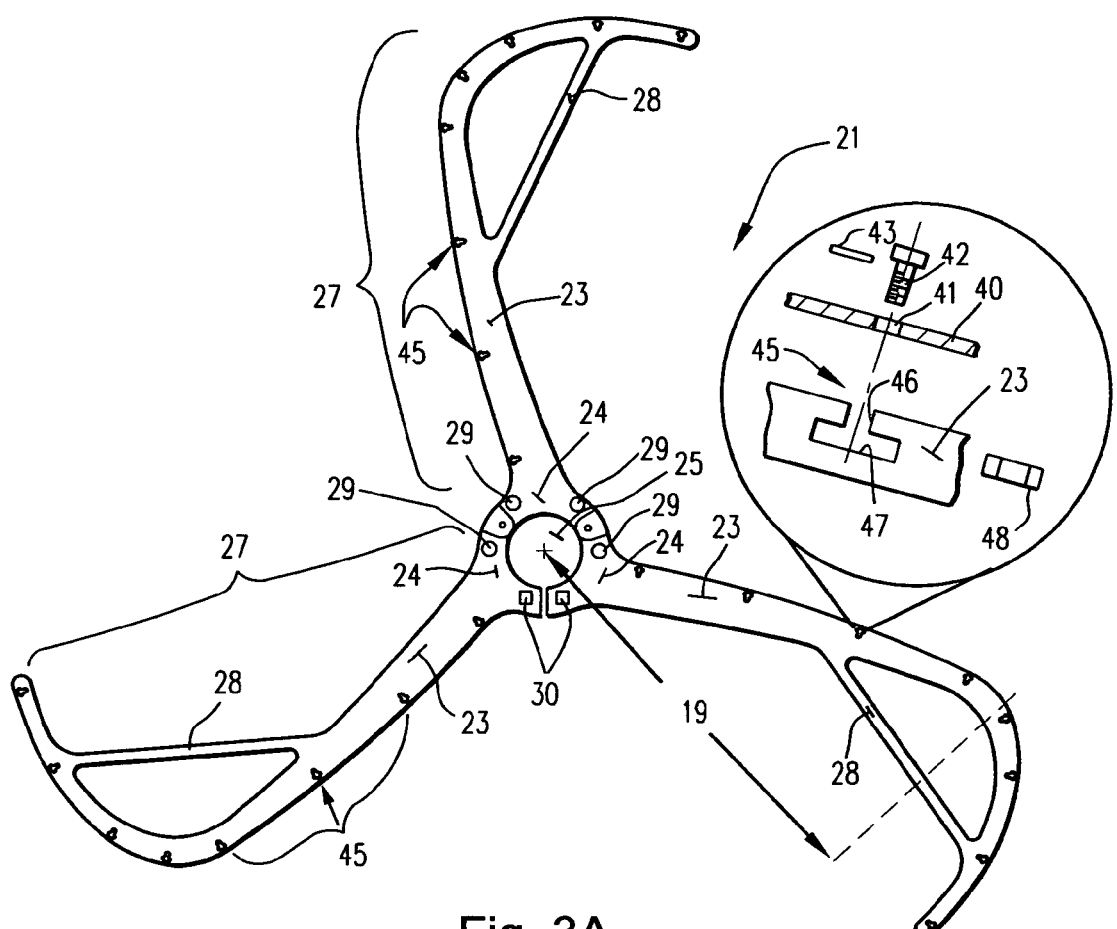
FIG. 3A is top plan view of an exemplary spoke for a third Savonius rotor according to the present invention.

FIG. 3A is a top plan view of one spoke 21 of an exemplary rotor 22 (see FIG. 5) according to the present invention. The spoke 21 has a configuration similar to that of the spokes in FIGS. 4 & 5 of Ser. No. 11/113,176 only specifically adapted for a particularly desirable three bladed Savonius rotor 22 (FIGS. 4 & 5).

In the FIG. 3A embodiment, for ease of manufacture, the spoke 21 is constructed in three major pieces 27 which may be identical, or almost identical (that is, substantially identical), and in use are arcuately spaced about 120 degrees from each other. [Alternatively, but less desirably, the entire spoke 21 can be formed in one piece.] Each piece 27 includes a rib 23 and a hub segment 24. The hub segments 24 when aligned and substantially abutting—as in FIG. 3A—define a complete hub, which in turn defines an open center area 25. In the preferred embodiment illustrated, the open center area 25 is substantially circular having substantially the same diameter as a single shaft (26 in FIG. 4) which it receives and is operatively connected (e.g. clamped) to. The skew factor 19 of the ribs 23 actually illustrated is about 0.78, and the curvature is about 2.6:1, and the aspect ratio of the rotor 22 of FIG. 5 made therefrom is about 2.67:1. The individual pieces 27 may be laser, water jet, or otherwise cut from sheets or plates of steel, aluminum (e.g. about ¼ to ½ inch thick), titanium, carbon fiber, or the like, or may be molded, or otherwise formed. Because of the high curvature and skew factor of the ribs 23, preferably a supporting element 28 is also integrally formed as part of each piece 27. The element 28, which preferably is a strut or bar as illustrated, extends between a central portion of the rib 23 and a portion adjacent the free end of the rib 23 spaced from the hub segment 24. The strut or bar 28 increases the strength of the rib 23 while minimizing the amount of material of the piece 27.

To facilitate clamping connection of the spoke 21 formed by the three pieces 27 to a shaft 26 (FIG. 4), openings 29, 30 are formed in the hub segments 24 during cutting, molding, or other formation thereof, or drilled or punched after formation. While two different shapes/configurations of openings 29, 30 are illustrated, other components may be designed and utilized which allow openings of only one configuration.

Figure 3B:
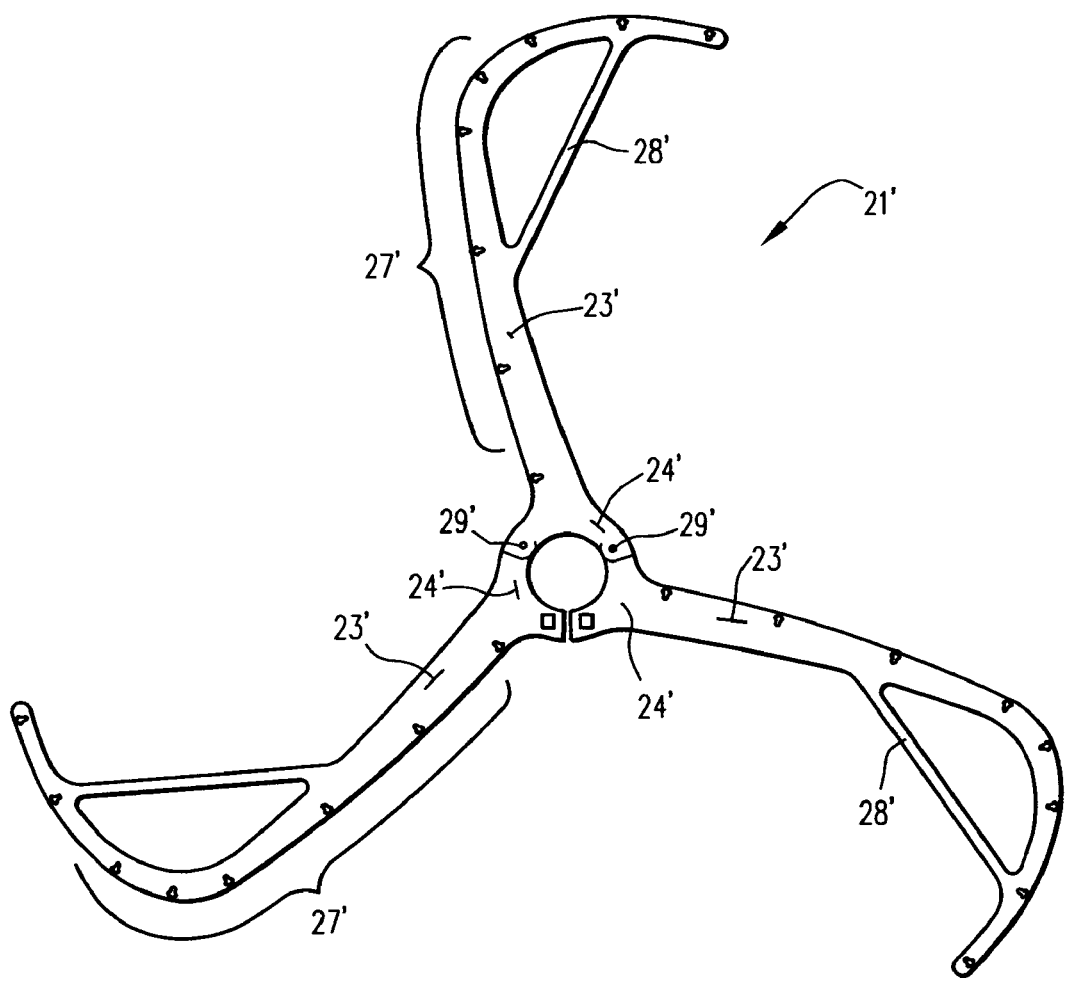
FIG. 3B is a top plan view of a minor modification of the spoke of FIG. 3A.
Figure 4:
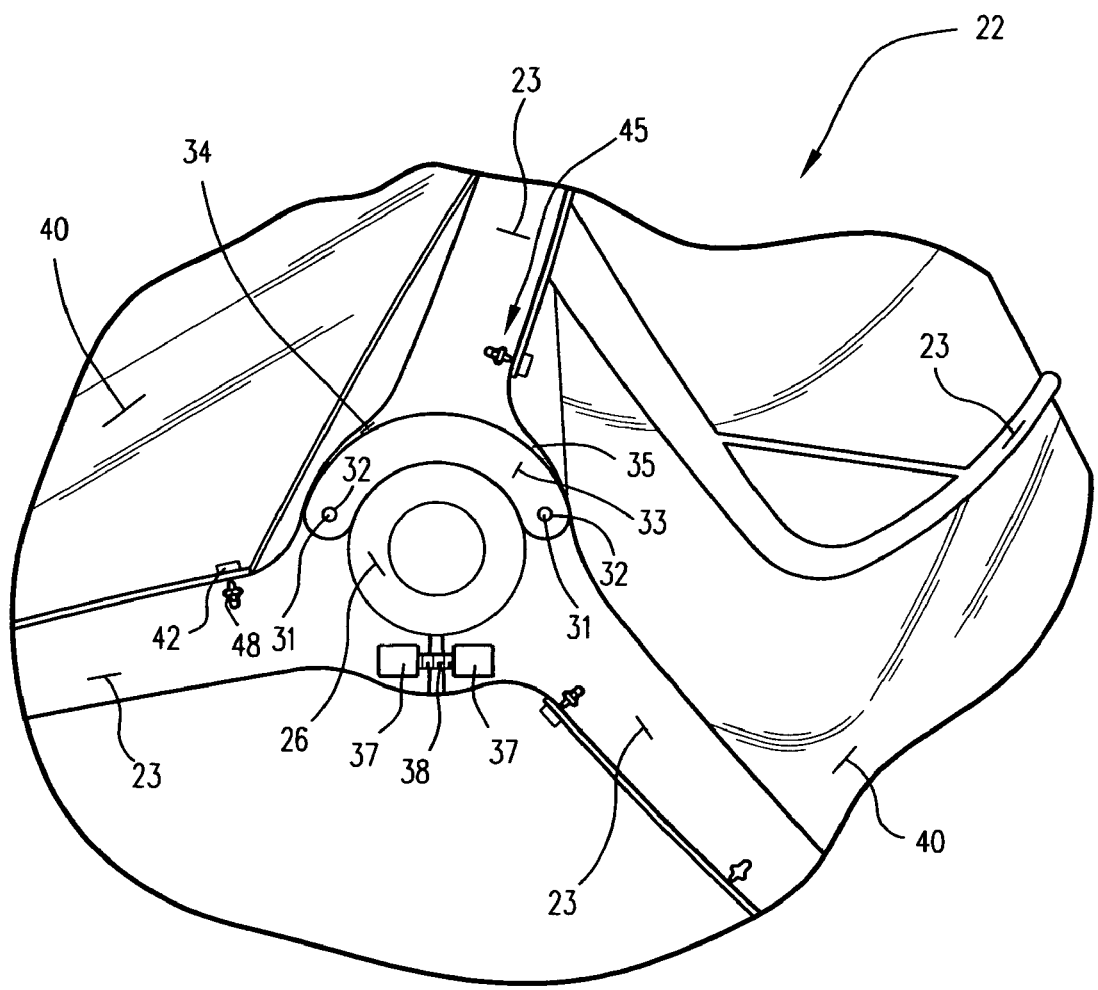
FIG. 4 is a detail perspective view of the spoke of FIG. 3B shown connected to a shaft and vanes to define a Savonius rotor.

The openings 29 may receive pins—such as steel or aluminum pins 31 in FIG. 4—therein. The pins 31 are force or friction fit in aligned openings 32 of one or more bridging pieces 33 (FIG. 4) preferably formed of the same material as the spoke 21. While the bridging piece 33 is shown connecting only the right and left pieces 27 of the spoke 21 of FIG. 3, other holes and pins can be associated therewith to connect to the central piece 27 of the spoke 21. Alternatively, two other smaller bridging pieces 34, 35 barely visible in dotted line in FIG. 4, with associated openings and pins (not shown) connect the leftmost piece 27 of spoke 21 to the center piece 27, and the rightmost piece 27 to the center piece 27, respectively. Other fasteners besides pins 31 may be utilized, and other connecting structures besides the bridges 33-35 and openings 29 shown.

In order to clamp the spoke 21 to the shaft 26, fastener receiving elements (e.g. nuts) 37 are provided in the openings 30, like in the FIG. 4 embodiment of co-pending application Ser. No. 11/113,176. The nuts 37 are internally threaded and welded, force fit, or otherwise securely inserted in the openings 30 or otherwise attached to the right and left pieces 27 of the spoke 21 of FIG. 3. An externally threaded fastener 38 connects the nuts 37 to each other, and when tightened moves the nuts 37 toward each other to clamp the spoke 21 to the shaft 26. Other conventional mechanical clamping components may be used instead of the nuts 37 and threaded fastener 38.

The spokes 21 axially spaced along shaft 26 (see FIGS. 4 & 5) are operatively connected to vanes 40, preferably in the same manner as in co-pending application Ser. No. 11/113, 176. That is, at spaced locations along each vane 40 where it will cooperate with a rib 23 of a spoke 21 are a plurality of openings 41, designed to receive mechanical fasteners (for example bolts 42, possibly with washers 43 between the bolt heads and vane 40).

Cut or otherwise formed into the spokes 21, particularly the ribs 23 thereof, are generally T-shaped channels 45, having a stem portion 46 for receipt of a bolt 42 shaft, and a cross portion 47 for receipt of a nut 48. This is most clearly seen in the enlarged segment of the rightmost rib in FIG. 3A. While first and second fasteners in the form of bolts 42 and nuts 48 are preferred, other conventional or hereafter developed fasteners may alternatively, or in addition, be provided. While the channels 45 may be provided in the inner (convex) surfaces of the ribs 23, preferably—as seen FIGS. 3 & 4—they are provided in the outer (concave) surfaces of the ribs 23.

FIG. 3B shows a spoke 21' which is a minor modification of the FIG. 3A embodiment (like components are shown by the same reference numeral only followed by a prime). In the FIG. 3B embodiment, the hub segments 24' are constructed so that the central opening 25' has the correct dimensions when the openings 29' in the center piece 27' are aligned with the openings 29' in the right and left pieces 27'. Thus the pins 31—see FIG. 4—pass through the aligned openings 29', and through the openings 32 in a single bridge piece 33, to hold all three pieces 27' together, e.g. for pivotal movement with respect to each other. When it is desired to clamp the spoke 21' to a shaft 26, the same mechanism as seen in FIG. 4 moves the left and right pieces 27' toward each other, and clamps spoke 21' to shaft 26.

The construction of FIGS. 3A, 3B, & 4 is highly desirable since it allows the vanes 40 to be securely held to the spokes 21, without likely high fatigue points, yet the connections may be made easily and inexpensively, and the construction easily assembled (and disassembled if desired) by unskilled labor. For example, the holes 41 and channels 45 may be punched, or laser or water-jet cut, and no drilling or tapping is necessary (although it may be provided in some circumstances).

In use of the spokes 21, 21' of FIGS. 3A and 3B, an end of shaft 26 is placed in opening 25, 25' and the spoke 21, 21' (with pins 31 in place) is slid along the shaft 26 to the desired "vertical" (during ultimate use as a VAWT) location. There, the bolt 38 is rotated with respect to the elements 37 to draw elements 37 toward each other and narrow or close the slot between the right and left pieces 27, 27'. This causes the interior surface of the hub defined by hub segments 24, 24' defining the opening 25, 25' to tightly engage the shaft 26 so there is no slippage therebetween. Typically the vanes 40 are affixed to the spokes 21, 21' after the spokes are placed in the desired position along shaft 26.

In all of the FIGS. 1-5 embodiments, flow directors may be provided at the top and bottom of the rotor, as illustrated in co-pending application Ser. No. 11/113,176.

If the vanes 40, or at least the upper portions thereof, are made of flexible, collapsible, material, such as sail cloth, a conventional solenoid controlled clamp—shown schematically at 50 in FIG. 5—may be used instead of the elements 37, 38. The clamp 50 may be responsive to a radio (or other remote) signal from an operator. Alternatively the clamp 50 may be a conventional quick release clamp that may be readily released manually by an operator.

FIG. 5 shows one embodiment of a rotor 22 according to the invention mounted in a metal (e.g. steel) tower 55. The tower 55 has three supporting legs 56 and three top cross pieces 57 connected to a central hub 58. However any number (e.g. four or more) of legs 56 may be provided. The central hub 58 mounts a conventional bearing 59 for the shaft 26.

At the base of the tower 55 is a bearing assembly 60 which mounts the bottom of the shaft 26. The bearing assembly 60 may comprise both a thrust bearing and a load bearing. The rotor 22 drives a driven element, shown schematically at 61 in FIG. 5, such as an electrical generator or alternator, pump, or any other element which can be driven by a wind turbine. A drive—shown schematically at 62 in FIG. 5—operatively connects the shaft 26 and driven element 61 with an effective gear ratio.

Figure 6:
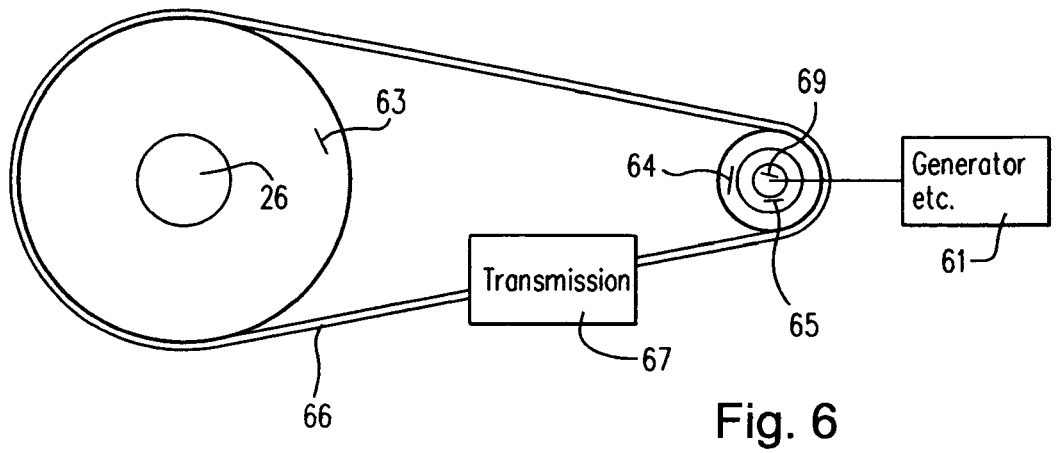
FIG. 6 is a detailed schematic view of the sprocket, chain, and transmission components of one exemplary form of the drive of the rotor of FIG. 5.

The drive 62—shown in more detail in the schematic, exemplary, illustration in FIG. 6—operatively connects the rotor 22 to the driven element 61 so as to automatically increase the effective gear ratio between 26 and 61 as the speed of rotation of the rotor 22 increases. One exemplary way this is accomplished is illustrated in FIG. 6. Note that the same drive 62 and driven element 61 may alternatively be used with a helical rotor, such as available from OY Windside Production Ltd. (see www.windside.com), or Windaus Energy Inc. (see www.windausenergy.com), or in U.S. Pat. Nos. 6,428,275 or 2,677,344.

In FIG. 6, the drive 62 comprises a first, large, sprocket 63 operatively connected to the shaft 26 for rotation therewith, and at least second and third smaller sprockets, 64, 65, respectively, operatively connected to a driven element 61, such as a generator. A chain 66 connects sprocket 63 to one of sprockets 64, 65. A transmission 67—shown only schematically in FIG. 6—is provided to automatically shift the chain from the larger 64 of the small sprockets to the smaller 65 thereof when the speed of rotation of the sprocket 63 (or shaft 26 connected thereto) substantially reaches a predetermined level.

In one exemplary form, the transmission 67 comprises a centrifugal force derailleur which automatically shifts the chain 66 between sprockets 64, 65. Such a derailleur is commercially available under the trade designation "Auto Shift" in LandRider™ bicycles from Venture Cycle, LLC, Lutherville, Md. Since the "Auto Shift" derailleur automatically senses the speed of the chain 66—which of course is directly related to the speed of the sprocket 63 and shaft 26, and which is in turn generally related to the average speed of the wind acting on rotor 22—no separate wind sensor is necessary. The "Auto Shift" derailleur also operates both ways, so that it downshifts back to sprocket 65 once the chain 66 speed falls below the predetermined level.

In the embodiment illustrated in FIG. 6, the effective gear ratio of the sprockets and the rotor speed at which the transmission 67 will shift will depend upon the size of the rotor 22, the size of the sprockets 63-65, the exact type of generator or other driven element 61 used, and other factors. In one example where the driven element 61 is a generator, the effective gear ratio provided by the sprockets 63, 64 is about 7:1, and that provided by sprockets 63, 65 is 10:1 or higher. If the rotor 22 reaches 50 rpm at a wind speed of about 5 mph, then the transmission 67 is designed to shift the chain 66 from sprocket 64 to sprocket 65 when it directly senses that the chain 66 reaches a speed comparable to a rotor 22 rotational speed of 50 rpm. Typically the rotational speed of shaft 26 which will result in the first shift will be between 10-50% of the expected maximum rotational speed of shaft 26, with other shifts provided at higher speeds if desired until the maximum effective gear ratio is provided for the components involved. The increase in effective gear ratio may be incremental (as for gears and sprockets) or substantially continuous (as for cones and associated belts).

Normally at least a third sprocket 69 is also provided (almost any practical number may be provided, for example six or seven rear sprockets are used in a LandRider bicycle). The transmission 67 will automatically shift to the third sprocket 69 at a point where the TSR is at a certain level (e.g. about 0.25) to help maintain the rotor Cp near an optimum value.

While the particular drive 62 and transmission 67 described above provide a simple, reliable, mechanical system, other systems that are more complex and/or are electromechanical may be used instead. As one example a system as shown in U.S. Pat. No. 5,984,814 may be utilized. As another example, a conventional sensor which generates an electrical signal substantially proportional to speed may be mounted in association with the shaft 26 or any element operatively connected thereto. The electric signal so generated can be used to cause a solenoid, electric motor, hydraulic or pneumatic cylinder, or the like, to shift a chain between sprockets, or shift between driven gears driven by a drive gear connected to shaft 26, etc. Any other conventional or hereafter developed mechanism for automatically changing the effective gear ratio between shaft 26 and driven element 61 in response to direct sensing of the speed of rotation of rotor 22 (or an element operatively connected thereto and moving at substantially the same speed) may alternatively be provided.

Using the drive 62 and transmission 67 according to the invention, it is possible to—without directly sensing wind speed (which may be highly variable and change too quickly)—change the resistance of a driven element connected to a Savonius rotor shaft in a manner proportional to wind speed. It is also not necessary to sense the generator input or output, although that can be done for other purposes. A Savonius rotor has high torque, but traditionally does not have high rotational speed, which is why it has not been in widespread use for generating electricity. However by increasing the effective gear ratio in response to the rotational speed of a Savonius rotor, and in a relatively simple manner, high generator output may be reached when the wind speed is high without stalling the Savonius rotor at low wind speed.

In order to change effective gear ratio to optimize Cp (that is keep the rotor within an optimum Cp range by adjusting the effective gear ratio in response to TSR), a conventional wind sensor for generating an electrical signal, rotor speed sensor for generating an electrical signal, and CPU may be connected to a CPU controlled transmission 67. The CPU calculates TSR from the wind and rotor sensors, and then controls the transmission 67 to adjust rotor speed and thereby TSR to keep the TSR in the optimum Cp range.

Figure 7:
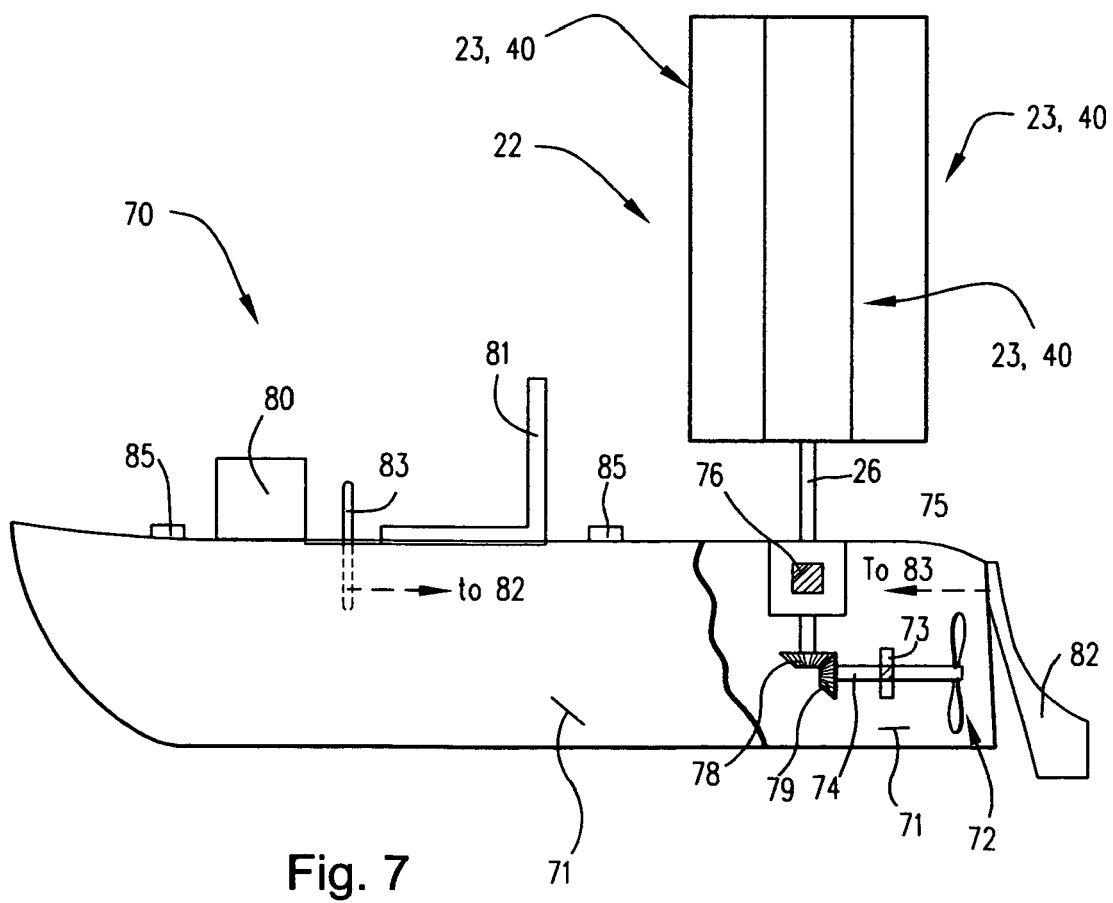
FIG. 7 is a schematic side elevational view, with portions cut away, of a catamaran utilizing the Savonius rotor of FIG. 5.

FIG. 7 illustrates a wind powered boat 70 that may use essentially the same rotor 22 as the rotor in FIGS. 4 & 5. The wind powered boat 70 comprises: A plurality of hulls 71 (the boat 70 is preferably a catamaran, trimaran, or other multi-hull). A propulsion mechanism—such as horizontal axis propeller 72—operatively connected (e.g. by support 73 and shaft 74) to at least one of the hulls 71 and between two of the hulls 71. A Savonius vertical axis wind turbine rotor 22 having an aspect ratio of at least 2:1, and comprising: at least one substantially vertical shaft 26; three blades (formed by ribs 23 and vanes 40) operatively connected to the shaft 26; and the blades 23, 40 having a curvature of greater than about 6:1, and a skew factor of at least about 0.65. And, the rotor 22 is operatively mounted to at least one of the hulls 71 (e.g. by bearing 75 and supports 76) and is also operatively connected to the propulsion mechanism 72, e.g. by meshing bevel gears 78, 79.

The wind powered boat 70—as the boat described in co-pending application Ser. No. 10/443,954—may have a manual assist 80 (such as a bicycle type drive for a propeller), a seat 81, a rudder 82, and a control stick 83 for operating the rudder 82 and operatively connected thereto, as by a lever. The hulls 71 may be connected together by cross pieces 85, and the seat 81 operatively connected to the cross pieces 85. The rotor 22 may be mounted to the rear of the seat 81 or in front of it (in which case the vanes 40 should be of transparent material). Alternatively, multiple rotors 22 and associated propulsion mechanisms 72 may be provided, one or more in front of seat 81, and one or more in back of seat 81.

All numerical values herein are approximate, and all narrow ranges within a broad range are specifically included herein (for example "about 0.75-0.85" means 0.76-0.856, 0.78-0.84, 0.745-0.80, and all other narrower ranges). While the invention has been herein shown and described in what is presently conceived to be the most practical and preferred embodiment, it is to be understood that many modifications may be made thereof within the scope of the invention, limited only by the prior art, to encompass all equivalents within the scope of the appended claims.

What is claimed is:

1. A Savonius vertical axis wind turbine rotor comprising; a plurality of spokes, each spoke comprising a hub having a substantially central opening, three at least partially arcuate ribs extending substantially radially outwardly from said hub with inner and outer surfaces, and a plurality of channels defined in at least one of said inner and outer surface of each said rib; a plurality of vanes of sheet material generally conforming to an inner or outer surface of a said rib and having openings therein operatively aligned with said channels; and first fasteners passing through said openings into said channels and cooperating with second fasteners provided within said channels to securely hold said vanes to said ribs, so that said vanes assume an at least partially curved configuration presenting alternately a substantially concave and substantially convex curvature to wind as the rotor rotates about a substantially vertical axis.

2. A rotor as recited in claim 1 wherein openings in said ribs are non-tapped, and wherein said first fasteners comprise bolts and said second fasteners comprise nuts.

3. A rotor as recited in claim 1 wherein each spoke is in three pieces each piece comprising a hub segment and a generally radial rib.

4. A rotor as recited in claim 3 wherein two of said spoke pieces are joined by a bridging piece, and two of said pieces are joined by a clamping mechanism which draws said pieces toward each other to reduce the size of said central opening.

5. A rotor as recited in claim 4 further comprising a central shaft extending between said hub central openings, said clamping mechanism clamping said spoke hub to said central shaft.

6. A rotor as recited in claim 5 wherein said clamping mechanism comprises a first fastener receiving element operatively connected to one of said spoke pieces at said hub segment, and a second fastener receiving element operatively connected to another, adjacent, spoke piece at said hub segment; and a fastener extending between said fastener receiving elements for drawing said elements toward each other to effect clamping.

7. A rotor as recited in claim 1 wherein each said hub defines a clamp adapted to cooperate with a shaft so that said hub is securely affixed to the shaft.

8. A rotor as recited in claim 7 wherein said clamp comprises: surfaces of said hub defining a substantially radial slot in said hub communicating with said central opening; first and second fastener receiving elements on opposite sides of said slot and operatively connected to said hub; and a fastener extending between said fastener receiving elements to draw said surfaces of said hub together.

9. A rotor as recited in claim 1 wherein said vanes generally conform to said outer surfaces of said ribs and are operatively connected thereto.

10. A rotor as recited in claim 1 wherein each of said ribs has a free end opposite said hub, and a supporting element extending between a central portion of said rib and a portion adjacent said free end thereof which increases the strength of said rib.

11. A rotor as recited in claim 3 wherein each said rib of each spoke piece has a free end opposite said hub segment, and a supporting element extending between a central portion of said rib and a portion adjacent said free end thereof which increases the strength of said rib; and wherein said spoke pieces are substantially identical.

12. A substantially rigid spoke piece for a Savonius wind turbine comprising: a hub segment having an arcuate extend of roughly about 120 degrees and defining with two other spoke pieces a substantially circular opening; and a generally radial rib having a substantially convex surface and a substantially concave surface wherein said rib of said spoke piece has a free end opposite said hub segment, and a supporting element extending between a central portion of said rib and a portion adjacent said free end thereof which increases the strength of said rib.

13. A vertical axis wind turbine comprising: a Savonius rotor comprising a plurality of blades having generally convex and concave surfaces operatively connected to each other, or a helical rotor; a driven element; and a drive operatively connecting the driven element to the rotor; the drive automatically increasing the effective gear ratio as the speed of rotation of the rotor increases.

14. A wind turbine as recited in claim 13 wherein the rotor is a Savonius, and further comprising at least one substantially vertical shaft operatively connected to said blades.

15. A wind turbine as recited in claim 14 wherein said rotor comprises three blades.

16. A wind turbine as recited in claim 13 wherein said drive directly senses rotor speed, or speed of an element operatively connected to said rotor, and does not directly sense wind speed, and wherein said driven element is an electric generator or alternator, and wherein said effective gear ratio is, at maximum, at least 10:1.

17. A wind turbine as recited in claim 13 wherein said drive adjusts the effective gear ratio to keep the tip speed ratio within a range for substantially optimum maximum power coefficient of the rotor.

18. A wind turbine as recited in claim 14 wherein said drive comprises: a first sprocket operatively connected to said at least one shaft; different size at least second and third sprockets, smaller than said first sprocket, and operatively connected to said driven element; a chain operatively connecting the first sprocket and one of said second or third sprocket; and a transmission comprising a centrifugal force responsive derailleur for automatically shifting said chain between said second and third sprockets.

19. A wind turbine as recited in claim 18 wherein said first sprocket and said third sprocket provide an effective gear ratio of at least 10:1, and said first sprocket and said second an effective gear ratio of less than 10:1.

\* \* \* \* \*